July 18, 1950     B. L. TOMALA     2,515,430
REEL
Filed July 22, 1948
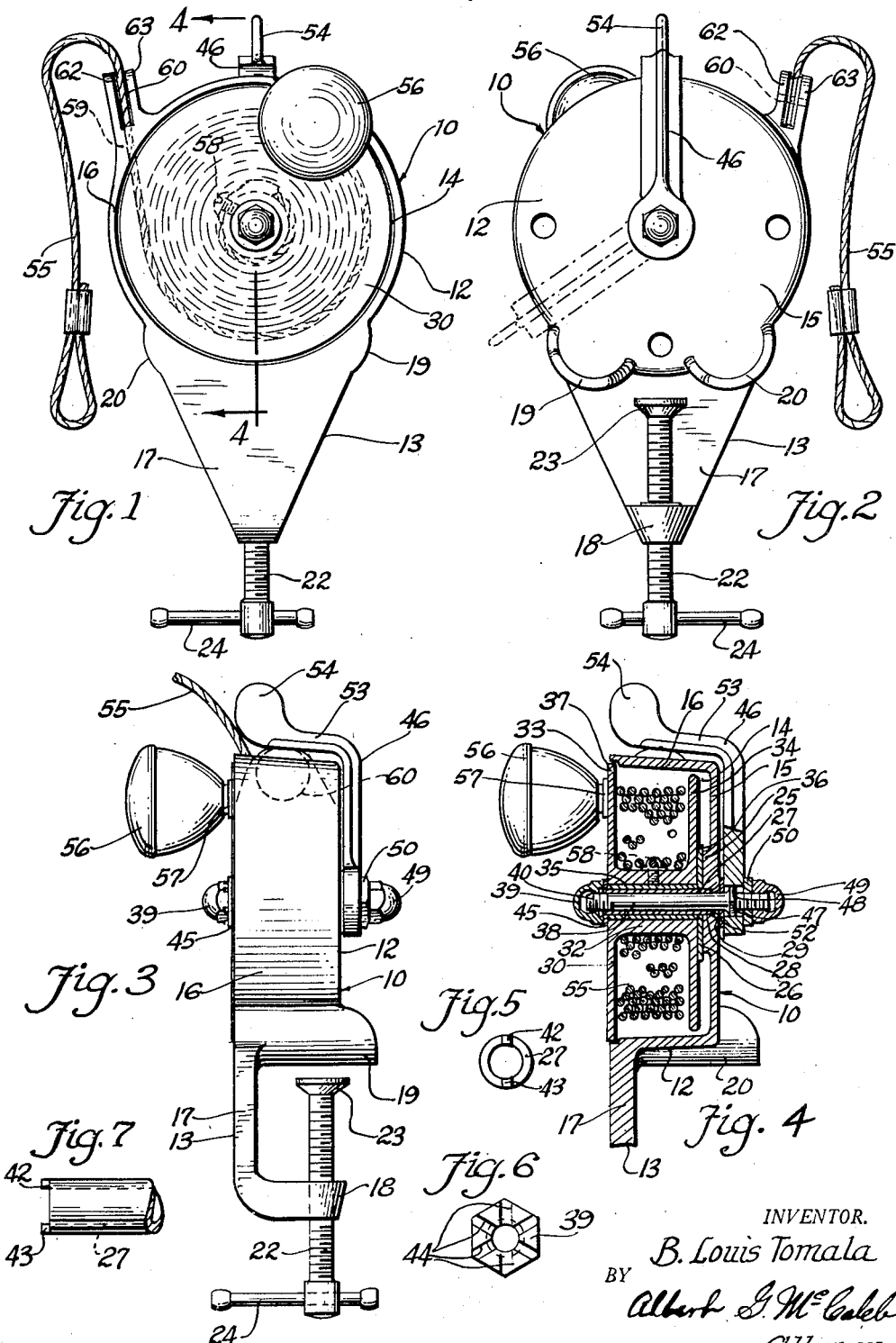
INVENTOR.
B. Louis Tomala
BY
Albert J. McCaleb
Attorney

UNITED STATES PATENT OFFICE 2,515,430

REEL

B. Louis Tomala, Chicago, Ill., assignor to
Charles W. Musser, Niles, Mich.

Application July 22, 1948, Serial No. 40,199

4 Claims. (Cl. 242—156)

This application relates to reels and more particularly to manually operable reels which embody a brake and are suited to outdoor use such, for example, as in applications to marine equipment.

One of the objects of my invention is to provide a reel structure for winding cable and the like and which embodies a winding spool adapted to fit into a housing in such a way that one end of the spool serves as a part of the housing enclosure.

As another object, the invention has within its purview the provision of a reel constructed and arranged in such a way that winding force is manually applied to the spool and the application of braking force for resisting spool movements is manually controllable by a movable lever disposed at a readily accessible position.

My invention also comprehends the use in a reel of a brake adjustable to apply and retain selected frictional resistance to the movements of the reel spool.

It is further within the purview of my invention to provide a reel adapted to be clamped onto a supporting structure such as a part of a boat, and wherein the conformation of the reel housing is such that a major portion of the clamp structure is integrally formed thereon.

As another object, this invention comprehends the provision of a reel brake structure in which the reel housing, spool and spool support post comprise parts of that brake structure.

Other objects and advantages of the invention will be apparent from the following description and the accompanying drawings in which similar characters of reference indicate similar parts throughout the several views.

Referring to the one sheet of drawings,

Figs. 1 and 2 are respectively front and back elevational views of a reel embodying a preferred form of my invention;

Fig. 3 is a side elevational view of the reel shown in Figs. 1 and 2;

Fig. 4 is a fragmentary side sectional view of the reel, wherein the section is taken substantially on a line 4—4 of Fig. 1 and viewed in the direction indicated by the arrows;

Fig. 5 is an end view, drawn to an enlarged scale, of a part embodying my preferred reel structure;

Fig. 6 is an end view of another part of the disclosed structure; and

Fig. 7 is a fragmentary side elevational view of the part shown in Fig. 5.

Having reference to the exemplary embodiment of my reel which is depicted in the accompanying drawings for illustrative purposes, a base 10 includes a housing portion 12 on one side of which a clamp portion 13 is integrally formed and projects outwardly therefrom. The housing portion 12 is dished to provide a spool receiving recess 14 and has a substantially plane wall 15 and a circular side wall 16 of generally cylindrical shape.

The clamp portion 13 is at one side of, and projects outwardly from, the exterior of the side wall 16, preferably being integrally attached thereto adjacent the open side of the spool receiving recess 14. This clamp portion is of a C-clamp type and is comprised by a web 17 of relatively uniform thickness projecting outwardly from the side wall 16 and desirably tapering to a narrower width toward the outer end. At the outer end, an integrally formed arm 18 projects from the web in opposed relationship to the wall 16. In opposed relationship to the arm 18, it is my preference to provide external protuberances 19 and 20 on the side wall 16 which desirably presents arcuate surfaces facing generally in the direction of the arm 18 and spaced apart circumferentially of the housing wall 16 and in substantially symmetrical relationship relative to the arm 18. A screw 22 is threaded into the arm 18 and extends therethrough in substantially parallel relationship to the web 17 and substantially midway between the protuberances 19 and 20. By preference, a clamping plate 23 is rotatably carried on the end of the screw 22 in opposition to the protuberances so that a supporting structure, such as the side or seat of a boat, may be gripped between the protuberances and the clamping plate to secure the reel at a desired position. At the end of the screw opposite the clamping plate, a handle 24 is carried by the screw for lateral sliding movement to facilitate the manual operation of the clamp.

Within the recess 14, the plane wall 15 of the housing is preferably provided with an inwardly extending central boss 25, as depicted in Fig. 4, which presents a substantially flat surface 26 facing toward the open side of the housing. Centrally of the boss 25 and in concentric and coaxial relationship with respect to the side wall 16, a bearing sleeve 27 is secured in an externally countersunk opening 28 in the wall 15 and extends into the recess 14. In the disclosed structure, the external end of the sleeve 27 is swaged outwardly, as at 29, and may be secured to the housing by brazing or other suitable means.

A spool 30 having a hub portion 32 and circular end flanges 33 and 34 disposed in substantially parallel relationship at opposite ends of the hub also has therein a central bearing sleeve 35 mounted for rotation upon the external surfaces of the sleeve 27. In the disclosed structure, a brake shoe 36 is disposed between the flat surface 26 of the boss 25 and the inner end surface of the spool 30. This brake shoe is made of a wear resisting material having a high coefficient of friction such as a disc of fiber or the like. The diameter of the inner end flange 34 of the spool is such that it approaches, but is freely rotatable within, the side wall 16 of the housing. The other end flange 33 of the spool preferably extends into and closely fits within a circumferential groove 37 in the outer marginal portion of the side wall 16, so as substantially to close the open end of the spool receiving recess 14.

In my disclosed reel, I have also provided a readily accessible and variable mechanism for adjusting the braking action tending to resist the rotation of the spool 30 within the housing. This mechanism includes a shaft 38 extending through and mounted for rotation within the sleeve 27. At one end, adjacent the exposed end of the spool 30, a nut 39 is threaded onto an exposed end portion 40 of the shaft 38. As illustrated in Figs. 5 and 7, the sleeve 27 has axially projecting tongues 42 and 43 thereon which extend beyond the exposed end of the spool 30. These tongues are of a size to fit within selected ones of a plurality of slots 44 in the end surface of the nut 39 (Fig. 6) to prevent rotation of the nut 39 relative to the end of the stationary bearing sleeve 27. In my preferred construction, a wear resisting washer 45 is interposed between the end surface of the nut 39 and the end of the spool 30, so that wear does not occur on the end of the spool itself.

The shaft 38 projects from the housing at the end opposite the nut 39 and has a handle 46 non-rotatably secured thereto. In the disclosed structure, an end portion 47 of the shaft 38 is polygonal and fits into a similarly shaped recess 48 in the handle to prevent relative rotation between the handle and shaft. Normally the handle is secured in place relative to the shaft by a nut 49 threaded onto the end of the shaft and desirably accompanied by a washer 50. The polygonal portion 48 on the shaft 38 is spaced from the external end surface of the plane wall 15 of the housing sufficiently to allow the shaft to move endwise by an amount that permits the nut 39 to be turned to a desired position with reference to the sleeve 27 over the ends of the projecting tongues 42 and 43. When the handle 46 is secured in place on the shaft 38 by the nut 49, it is held against the outer end of the polygonal portion 47 and a washer 52 serves as a spacer and wear resisting element between the surfaces of the handle 46 and the plane wall 15 of the housing.

For ease of access and operation, the handle 46 is provided with an angularly projecting end portion 53 and a grip portion 54 disposed adjacent and in spaced relationship to the outer surface of the side wall 16. Also, when adjusted for effective operation, a position of the nut 39 is selected at which the spool is free to rotate when the handle is swung to a position for loosening the shaft relative to the nut 39. On the other hand, the position of the nut 39 is so selected that when the handle is swung in the opposite direction, the spool may be tightly gripped between the nut 39 and the brake shoe 36 on its opposite sides. Intermediate positions of the handle provide varied degrees of braking action as the result of the frictional force exerted between the brake shoe 36 and the end of the spool.

For effecting rotation of the spool to wind cable such as 55 thereon, I have provided a knob type handle 56 which is supported for rotation relative to the flange 33 of the spool by a stud 57 which is secured to the flange 33 at a position radially spaced from the axis of rotation of the spool.

In the disclosed reel structure, the flexible cable 55 has its inner end anchored to the spool by fastening means such as a set screw 58. The other end of the flexible cable extends outwardly from the spool through an opening 59 in the side wall 16 of the housing. To facilitate the operation of the reel when mounted in different positions, a pulley 60 is rotatably supported between spaced and substantially parallel lugs 62 and 63 which are integrally formed on and project outwardly from the exterior of the side wall 16 adjacent the opening 59.

From the foregoing description of the structure and manner of operation of my reel, it may be readily understood that I have provided a compact, durable and effective reel, the construction and arrangement of which not only adapts it to be quickly and securely mounted at various positions and with reference to various structures so as to be handy for use, but which also makes efficient use of the various structural parts and portions and has a readily accessible and manually adjustable brake by which varying degrees of friction may be utilized for braking action against rotation of the spool.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A reel comprising, in combination, a reel base including a dished housing portion having a substantially plane wall and an integral and substantially circular side wall, and an integrally formed C-clamp portion projecting outwardly of the side wall of the housing portion, a screw element threaded into a part of the C-clamp portion for effecting gripping action to mount the reel, a shaft journalled centrally of the plane wall and extending in substantially coaxial relationship to the circular side wall, a sleeve secured to the plane wall and fitting over the extending portion of the shaft, a spool having a hub and end flanges and being journalled for rotation on said sleeve, one of said end flanges of the spool being of a size to fit freely into the dished housing portion inside the circular side wall and adjacent the plane wall, the other of said end flanges fitting closely adjacent the circular side wall and providing a closure for the dished housing, a nut threaded onto the end of said shaft adjacent said other of the end flanges and locked against rotation relative to said sleeve, a brake shoe interposed between said one of the flanges and said plane wall, a handle secured to the end of said shaft opposite said nut for rotating the shaft relative to the nut, whereby the nut forces the spool against the brake shoe to effect adjustable braking action on the spool, and a handle on the spool for manually turning the spool relative to the shaft and base.

2. A reel as defined in claim 1, and wherein said dished housing portion has a cable opening in the side wall thereof, and said side wall has integrally formed lugs thereon projecting outwardly therefrom in substantially parallel relationship on opposite sides of the cable opening, and a cable guide pulley supported for rotation between the lugs.

3. A reel comprising, in combination, a reel base including a dished housing portion having a substantially plane wall and an integral and substantially circular side wall, a shaft journalled centrally of the plane wall and extending in substantially coaxial relationship to the circular side wall, a sleeve secured to the plane wall and fitting over the extending portion of the shaft, a spool having a hub and end flanges and being journalled for rotation on said sleeve, one of said end flanges of the spool being of a size to fit freely into the dished housing portion inside the circular side wall and adjacent the plane wall, the other of said end flanges fitting closely adjacent the circular side wall and providing a closure for the dished housing, a nut threaded onto the end of said shaft adjacent said other of the end flanges and locked against rotation relative to said sleeve, a brake shoe interposed between said one of the flanges and said plane wall, a handle secured to the end of said shaft opposite said nut for rotating the shaft relative to the nut, whereby the nut forces the spool against the brake shoe to effect adjustable braking action on the spool, and a handle on the spool for manually turning the spool relative to the shaft and base.

4. In a reel, the combination comprising a reel base including a dished housing portion having a substantially plane wall and an integral and substantially circular side wall, a shaft journalled centrally of the plane wall and extending in substantially coaxial relationship to the circular side wall, a sleeve secured to the plane wall and fitting over the extending portion of the shaft, a spool having a hub and end flanges and being journalled for rotation on said sleeve, a nut threaded onto the end of said shaft adjacent one of said end flanges of the spool and locked against rotation relative to said sleeve, a brake shoe interposed between the other of said flanges and said plane wall, and a handle secured to the end of said shaft opposite said nut for rotating the shaft relative to the nut, whereby the nut forces the spool against the brake shoe to effect adjustable braking action on the spool.

B. LOUIS TOMALA.

REFERENCES CITED

The following references are of record in the file of this patent:

UNITED STATES PATENTS

| Number | Name | Date |
|---|---|---|
| 2,079,908 | House | May 11, 1937 |